United States Patent Office 3,118,867
Patented Jan. 21, 1964

3,118,867
ACYLAMINO-CARBOXYLIC ACID AMIDES PREPARED BY REARRANGEMENT IN STRONGLY BASIC MEDIUM
Max Brenner, Riehen, Switzerland, assignor to Ciba Corporation, a corporation of Delaware
No Drawing. Filed Oct. 11, 1957, Ser. No. 689,474
Claims priority, application Switzerland Oct. 17, 1956
17 Claims. (Cl. 260—112)

This invention relates to a new process for the manufacture of acylamino-carboxylic acid amides by a rearrangement reaction.

In my copending application Serial No. 595,080, filed July 2, 1956, now U.S. Patent No. 2,850,491, is described a new process for the manufacture of peptides. According to that process, for example, compounds of the formula

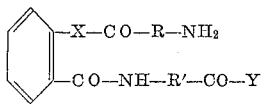

in which X indicates oxygen or sulfur, R and R' the divalent radicals of amino-acids, and Y indicates the radical of an amino acid or a peptide, are treated with basic agents, whereby rearrangement takes place to a compound of the formula

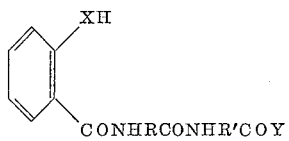

By splitting off the aromatic radical, a peptide is obtained of the formula H$_2$NRCONHR'COY. As basic agent triethylamine is advantageously used.

The present invention is based on the surprising observation that α-amino-carboxylic acid esters of α:β-saturated aliphatic β-hydroxy- or β-mercapto-carboxylic acid amides with at least one free amide and amino hydrogen atom each are capable of undergoing an analogous rearrangement, whereby the corresponding β-hydroxy or β-mercaptoacyl-α-amino-acyl amides are obtained.

The reaction can be diagrammatically represented as follows:

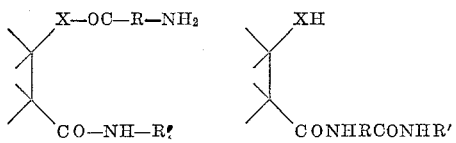

In these formulae, X indicates oxygen or sulfur, R the divalent radical of an α-amino-carboxylic acid and R' hydrogen or an organic radical, especially the radical of an amino acid or a peptide. When R' is hydrogen, simple β-hydroxy- or β-mercaptoacyl-α-amino-carboxylic acid amides are obtained. On the other hand when R' is the radical of an amino acid or a peptide, a β-hydroxy- or β-mercaptoacyl-peptide results or a β-hydroxy- or β-mercaptoacyl-peptide of which the molecule is lengthened by one amino acid unit.

A particular advantage of the new reaction is to be recognised in the fact that the β-hydroxy- or β-mercaptoacyl radical can itself be part of an amino acid particularly of a natural amino acid, or of a peptide.

By starting, for example, from an amino acid ester of a peptide of the formula

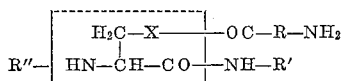

in which X indicates oxygen or sulfur, R the divalent radical of an α-amino acid and R' and R'' the radical of an amino acid or of a peptide, and the portion of the molecule shown enclosed corresponds to the radical of cysteine or serine, there is obtained directly as a result of the rearrangement a peptide of the formula

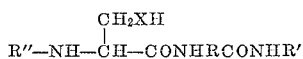

By esterification of the hydroxyl or mercapto group with an amino acid an by repetition of the rearrangement the peptide chain can be lengthened by any number of the same or different amino acid radicals in the simplest manner.

Whereas according to the process of the above-mentioned copending application only an extension of the end of a peptide chain is possible and subsequently the aromatic radical must be split off, it is possible by suitable selection of the starting materials according to the present process to incorporate in a peptide chain the amino acids in vicinal positions to cysteine, serine or threonine, without having to split off again the β-hydroxy- or β-mercaptoacyl radical.

The described rearrangement reaction in the aliphatic series cannot be carried out with the weak basic condensing agents which are preferably used in the aromatic series. It has been found to be necessary to use strongly basic agents and advantageously to operate in such a medium that no substantial hydrolysis of the ester group takes place. Strongly basic condensing agents suitable for the reaction are preferably such as are capable of ionising an amide group. Of these there may primarily be mentioned the hydrocarbon compounds, amides and tertiary alcoholates of alkali and alkaline earth metals, as for example sodamide, potassium tertiary butylate, sodium phenyl and linthium phenyl. It is of advantage to use the metal amides in liquid ammonia as medium, whereas the tertiary alcoholates can be used in the corresponding alcohol. The reaction temperature can vary within wide limits. Especially good results are achieved by carrying out the reaction below 30° C.

To summarise, the new process for the manufacture of acylamino caraboxylic acid amides can be characterized in that α-amino-carboxylic acid esters of the β-hydroxy- or β-mercapto carboxylic acid amides with at least one free amide and amino hydrogen atom each, or salts of these compounds, are rearranged by treatment with strongly basic agents preferably such as are capable of ionising an amide group, to form the corresponding acylamino-carboxylic acid amides.

As stated above there are used as starting materials especially esters of natural α-amino-carboxylic acids with β-hydroxy- or β-mercaptoacyl compounds of natural amino acids or peptides. The acyl radical can contain further substituents, for example in α-position a substituted amino group. As substituted amino groups there are concerned especially such as are substituted by the radical of a preferably natural amino acid or a peptide, or as can easily be converted by solvolysis, hydrolysis or hydrogenolysis into the free amino group, as for example amino groups substituted by a formyl, trifluoracetyl, carbobenzoxy, tosyl or trityl radical or two benzyl radicals. Preferred starting materials are, for example, esters of α-amino acids with N-substituted cysteyl, seryl or threonyl compounds of amino acids or peptides.

Reactive functional groups present in the starting materials, as for example free hydroxyl, thiol or carboxyl groups or amino groups which do not take part in the rearrangement, are preferably protected in the customary manner.

The starting materials are known or can be obtained by processes known per se or if desired by the application of the process of this invention.

The following examples illustrate the invention:

Example 1

At 20° C., 98 mg. (0.5 mmol) of O-glycyl-β-hydroxy-β-methylpropionic acid amide hydrochloride are brought into very fine suspension in 23 ml. of absolute tertiary butanol, and treatment is carried out with 1.88 ml. (4 equivalents) of an N-solution of potassium tertiary butylate in tertiary butanol, followed after half an hour by the addition of at least 4 equivalents of moist ion exchanger Amberlite IR–120 (H-form), at least one equivalent of moist ion exchanger Amberlite IRA–400 (OH-form) and 25 ml. of water. As soon as the pH-value has sunk to 6–7, the whole is filtered and the filtrate evaporated to dryness under vacuum at 35° C. The residue consists of pure β-hydroxy-β-methylpropionyl-glycinamide. It crystallises from ethanol-ether in prisms of M.P. 107–108° C.

The O-glycyl-β-hydroxy-β-methylpropionic acid amide hydrochloride used as starting material can be obtained in the following manner:

1.55 grams (3.86 mmol) of carbobenzoxy-glycine anhydride are dissolved in 5 ml. of absolute pyridine and the solution, cooled to 0° C., is poured into a solution of 390 mg. (3.8 mmol) of β-hydroxy-β-methyl propionic acid amide in 5 ml. of absolute pyridine at 0° C. After keeping for 40 hours in an ice chest (3–4° C.) a little ice is added to the solution and after 30 minutes the mixture evaporated under vacuum at 35–40° C. bath temperature. The oily residue is taken up in 100 ml. of ethyl acetate and 10 ml. of 2 N-hydrochloric acid and after separation of the aqueous phase, the solution extracted twice with 2 N-hydrochloric acid and then exhaustively with 10% potassium bicarbonate solution and finally once with 10 ml. of saturated common salt solution. After drying of the solution with sodium sulphate it is evaporated under vacuum. The oily residue crystallises within 24 hours on standing under ether-petroleum ether. For recrystallisation, the crude product is dissolved in a little hot ethyl acetate, treated with petroleum ether to the commencement of turbidity and clarified by addition of a few drops of ethyl acetate. By slow crystallisation in a bath at 35° C., very fine needles of O-(carbobenzoxy-glycyl)-β-hydroxy-β-methyl-propionic acid amide are obtained in fine tufts. M.P. 78–79° C.

400 mg. (1.36 mmol) of this carbobenzoxy compound in 30 ml. of glacial acetic acid are treated with hydrogen for 30–40 minutes at room temperature in the presence of 1.36 ml. of N-hydrochloric acid and 60 mg. of palladium-charcoal (10%). The product is filtered and the filtrate evaporated under vacuum at 35° C. to dryness and the residue crystallised from methanol-ethyl acetate. O-glycyl-β-hydroxy-β-methylpropionic acid amide is thus obtained in prismatic crystals of M.P. 140–141° C.

Example 2

(a) At 20° C., 100 mg. (0.33 mmol) of O-glycyl-N-benzoyl serinamide hydrochloride are brought into very fine suspension in 20 ml. of tertiary butanol, treatment is carried out with 1 ml. (3 equivalents) of an N-solution of potassium tertiary butylate in tertiary butanol and after half an hour at least 3 equivalents added of moist ion exchanger Amberlite IR–120 (H-form), at least 1 equivalent of moist ion exchanger Amberlite IRA–400 (OR-form) and 20 ml. of water. As soon as the pH has fallen to 6–7, the whole is filtered and the filtrate evaporated to dryness under vacuum at 35° C. The residue, shown by paper chromatography to be a uniform substance, crystallises from moist acetone ethyl acetate. The resulting benzoyl-seryl-glycinamide forms prismatic crystals of M.P. 141.5–142.5° C.

(b) 12 mg. of sodium (0.5 mg.-atom) are dissolved in 20 ml. of liquid ammonia and, when the blue solution has become decolourised, 60 mg. (0.2 mmol) of O-glycyl-N-benzoyl-serinamide hydrochloride added with brisk stirring and the ammonia allowed to evaporate. Working up takes place in a manner analogous to process (a) and yields the same product.

The O-glycyl-N-benzoyl-glycinamide hydrochloride can be prepared in the following manner.

N-benzoyl-serine is dissolved in 25 times the quantity of methanol and with stirring esterified with diazomethane. After evaporation of the solvent under vacuum, the residue is taken up 20 times the quantity of ethyl acetate and extracted twice, in each case with 10–15 ml., of 2 N-hydrochloric acid, 10% potassium carbonate solution and saturated common salt solution. After drying the solution with sodium sulphate, it is evaporated under vacuum and the remaining viscous oil converted into the amide at 20° C. by dissolving and 24 hours standing in 20 times the quantity of a methanolic solution saturated with ammonia. On evaporation of the methanolic ammonia solution under vacuum, a white crystalline residue is obtained which is washed with a little ethyl acetate (N-benzoylserinamide is practically insoluble in ethyl acetate) and after drying under vacuum recrystallised from hot water or methanol alcohol. M.P. 165–167° C.

3.8 grams (9.5 mmol) of carbobenzoxy glycine anhydride are dissolved in 15 ml. of absolute pyridine and the solution, cooled to 0° C., is poured into a solution of 1.9 grams (9.1 mmol) of N-benzoyl-serinamide in 20 ml. of absolute pyridine at 0° C. After standing for 36 hours in an ice chest (3–4° C.) a little ice is added to the solution and the mixture evaporated under vacuum after 30 minutes at 35° C. bath temperature. The residue is dissolved in about 100 ml. of ethyl acetate and the solution extracted exhaustively with 2 N-hydrochloric acid and 10% potassium bicarbonate solution. After washing of the solution with saturated common salt solution, it is dried with sodium sulphate and the solvent removed under vacuum at 35° C. The crude O-carbobenzoxyglycly-N-benzoyl-serinamide forms a white foam. For purification it is recrystallised from acetone/petroleum ether. M.P. 138–140° C.

0.8 gram (2 mmol) of this carbobenzoxy compound in 50 ml. of ethanol and 23 ml. of water is treated in the presence of 2 ml. of N-hydrochloric acid and 200 mg. of palladium-charcoal (10%) with hydrogen for 60–90 minutes at room temperature. The whole is filtered, the filtrate evaporated to dryness and the residue crystallised from methanol-ethyl acetate. The resulting O-glycyl-N-benzoyl-serinamide hydrochloride forms needles of M.P. 162–164° C.

Example 3

At 20° C. and with exclusion of moisture, 200 mg. (=0.55 millimol) of O-glycyl-N-(benzoyl-glycyl)-DL-serinamide hydrochloride are suspended in about 15 cc. of dry tertiary butanol (vibro mixer) and there are added 1.6 cc. of a 1 N solution of potassium tertiary butylate in tertiary butanol. The solution turns yellow and is admixed after 30 mintues with at least 3 equivalents of moist ion exchanger Amberlite IR–120 (H-form), at least 1 equivalent of moist ion exchanger Amberlite IRA-400 (OH-form) and 15 cc. of water. As soon as the pH of the solution has fallen to 6–7 and chlorine can no longer be detected, the solution is filtered and evaporated to dryness at 35° C. in vacuo. The crystalline residue, shown by paper chromatography to be a uniform substance, is recrystallized twice from methanol/ether. The yield is 70% of N-(benzoyl-glycyl)-DL-seryl-glycinamide; melting point, 119–120° C.; fine needles.

The O-glycyl-N-(benzoyl-glycyl)-DL-serinamide hydrochloride used as starting material can be prepared in this manner:

3.7 grams (=35 millimol) of DL-serine are dissolved in 12 cc. of water and rendered weakly alkaline with about 17 cc. of 2 N-caustic soda solution. The solution is heated to 65° C. and while it is being stirred there are introduced in portions 8 grams (=39 millimol) of freshly prepared, still moist hippuric acid azide (cf. Th. Curtius, J. prakt. Chem., 52, 252 (1895)). By the dropwise addition of 2 N-caustic soda solution, the solution is kept weakly alkaline. After 40–60 minutes, it is allowed to cool, filtered, and acidified with concentrated hydrochloric acid (Congo). The mixture is kept in a refrigerator for 12 hours and the colorless crystals then separated by filtering with suction, washed with ice water and recrystallized twice from water. The N-(benzoyl-glycyl)-DL-serine, of which a 65% yield is obtained, melts at 167–169° C. After crystallizing twice more from methanol/ether the melting point is at 171–173° C.

N-(benzoyl-glycyl)-DL-serine is dissolved in 30 times its quantity of methanol and esterified with ethereal diazomethane solution. The crude ester is converted into amide in the usual manner. The methanolic ammonia solution is evaporated under reduced pressure and the residue consisting of N-(benzoyl-glycyl)-DL-serinamide crystallizes from methanol ethyl acetate in the form of short prisms. The melting point is at 176° C. and the yield is 80%.

After recrystallizing from the same mixture of solvents the M.P. is at 178.5–179° C.

With exclusion of moisture, 0.85 gram (=4 millimol) of carbobenzoxyglycine and 0.56 cc. (=4 millimol) of triethylamine are dissolved in 10 cc. of tetrahydrofurane. The mixture is cooled to about −80° C. (toluene/Dry Ice). With shaking, 5.6 millimols of phosgene, dissolved in absolute toluene (1.8 mmol of phosgene per cc. of solution), are now added dropwise. After 15 minutes' standing at −80° C. there is added 0.64 g. (=2.4 millimol) of N-(benzoyl-glycyl)-DL-serinamide, dissolved in 4.2 cc. of pyridine and 3 cc. of dimethyl formamide and cooled to 0° C.

The reaction mixture is shaken for a short while and then allowed to stand overnight at 0° C. It is evaporated under reduced pressure at 30–40° C., the oily residue is taken up in ethyl acetate, and the solution extracted in succession with 2 N-hydrochloric acid, 10% potassiumbicarbonate solution, and with water. The solution is then dried with sodium sulfate and the ethyl acetate evaporated under reduced pressure; there remains an amorphous powder which crystallizes from ethanol/ether. The melting point is at 177–179° C., and the yield is 50% of O-(carbobenzoxyglycyl)-N-benzoyl-glycyl)-DL-serinamide.

380 mg. (=0.83 millimol) of the carbobenzoxy compound are dissolved in 30 cc. of 65% ethanol and, after the addition of 0.85 cc. of 1 N-hydrochloric acid and about 100 mg. of palladium charcoal (10%), treated with hydrogen at room temperature for about 40 minutes. On filtration and evaporation of the solution there remains behind a colorless foam which crystallizes from methanol/ethyl acetate in form of handsome needles. The melting point is at 160–162° C. (decomposition), and the yield is 80% of O-glycyl-N-(benzoyl-glycyl)-DL-serinamide hydrochloride.

*Example 4*

100 mg. (0.33 millimol) of O-glycyl-N-benzoyl-L-serinamide-hydrochloride are suspended at 20° C. in 20 cc. of absolute tertiary butanol (vibro mixer) and 1 cc. (3 equivalents) of a 1 N-solution of potassium tertiary butylate in tertiary butanol added. After half an hour there are added at least 3 equivalents of moist ion exchanger Amberlite IR–120 (H-form), at least 1 equivalent of moist ion exchanger Amberlite IRA–400 (OH-form) and 20 cc. of water. As soon as the pH has fallen to 6–7, the mixture is filtered, and evaporated to dryness under reduced pressure at 35° C. The crystalline residue (80%), found by paper chromatography to be a unitary substance, consists of N-benzoyl-L-seryl-glycinamide; it crystallizes from methanol/ether in the form of needles melting at 156–157° C. $[\alpha]_D^{26} = +28.7° \pm 1.5°$ (c.=0.66 in EtOH 95%). Mixed melting point test, paper chromatogram, and IR spectrum show the product to be identical with N-benzoyl-L-seryl-glycinamide obtained in a different manner.

The O-glycyl-N-benzoyl-L-serinamide hydrochloride used as starting material can be obtained in this manner:

N-benzoyl-L-serin methyl ester (E. M. Fry, J. Org. Chem. 15, 440 (1950)) is converted in known manner with methanolic ammonia solution. On evaporation after two days' standing at room temperature the amide is obtained in crystalline form. Recrystallization twice from methanol/ether gives 80% of N-benzoyl-L-serinamide of melting point 174–176° C., $[\alpha]_D^{25} = +58° \pm 1°$ (c.=0.5, EtOH 95%).

In a 50 cc. round flask there is dissolved with exclusion of moisture 0.835 g. (=4 millimol) of carbobenzoxy glycine and 0.56 cc. (=4 millimol) of triethylamine in 10 cc. of tetrahydrofurane. The mixture is cooled to about −80° C. (toluene/Dry Ice). There are added dropwise while shaking 5.5 millimols of phosgene, dissolved in absolute toluene (3.84 millimols of phosgene per cc. of solution). The mixture is allowed to stand for 15 minutes at −80° C. and then there is added 0.63 gram (=3 millimol) of N-benzoyl-L-serinamide, dissolved in 6 cc. of pyridine and 1.5 cc. of dimethyl formamide and cooled to 0° C.

The reaction mixture is shaken for a short while and allowed to stand at 0° C. overnight. It is evaporated to dryness in vacuo at 35° C., the residue taken up in ethyl acetate and extracted first with 2 N-hydrochloric acid and then with 10% potassium bicarbonate solution, washed neutral with water, dried over sodium sulfate, and the ethyl acetate evaporated under reduced pressure at 30° C. The residue, consisting of white crystals, on recrystallization twice from methanol/ether gives 60% O-(carbobenzoxyglycyl)-N-benzoyl-L-serinamide of melting point 167–168° C., $[\alpha]_D^{25} = +15.2° \pm 1.5°$ (c.=0.5 in glacial acetic acid).

0.5 g. (=1.25 millimol) of the carbobenzoxy compound are dissolved in about 50 cc. of 70% ethanol and, after the addition of 1.4 cc. of 1 N-hydrochloric acid and about 100 mg. of palladium charcoal (10%), treated for 60 minutes with hydrogen at room temperature. The reaction mass is filtered, evaporated to dryness at 30° C. and recrystallized from methanol/ethyl acetate. The yield is 85% of O-glycyl-N-benzoyl-L-serinamide hydrochloride of melting point 188–190° C.

$[\alpha]_D^{26} = +33° \pm 1.5°$ (c.=0.7 in hydrochloric acid).

*Example 5*

The emulsion of 80 mg. of O-glycyl-N-benzoyl-DL-threonin-amide-perchlorate (0.21 millimol; crude product) in 20 cc. of absolute tertiary butyl alcohol is stirred for 20 minutes at room temperature (vibro mixer) with 0.65 cc. of a 1 N-solution of potassium tertiary butylate in tertiary butyl alcohol. 15 cc. of water are added and the faintly yellow limpid solution is added to an excess of moist Amberlite IR–120 (H-form) and Amberlite IRA–400 (OH-form) and the whole is stirred until the pH has fallen to about 6 and the flame coloration no longer shows the presence of potassium. The filtered solution is evaporated to dryness at 40° C. The crude product (44 mg.; 74.7%) is taken up in acetone, mixed with ether until it becomes turbid, and inoculated to obtain needle-shaped crystals of N-benzoyl-DL-threonyl-glycinamide. After recrystallization from acetone, the product melts at 157–159° C. The melting point of N-benzoyl-DL-threonyl-glycinamide obtained in a different manner is at 158–159° C. Mixed melting point: 155–157° C. The IR spectra (Nujol) of the rearrangement product and of the comparative substance are identical.

The perchlorate of O-glycyl-N-benzoyl-DL-threoninamide used as starting material can be prepared in the following manner:

The crude methyl ester (Harol D. West, Herbert E. Carter, J. Biol. Chem. 119, 116 (1937)) prepared from 2.24 g. (10 millimols) of N-benzoyl-DL-threonin (Karl Pfister, C. A. Robinson, A. C. Shabica, Max Tishler, J. Amer. Chem. Soc., 71, 1103 (1949)) is mixed with 100 cc. of ammoniacal methanol (saturated at 0° C.) and the solution kept in a closed vessel for 36 hours at room temperature. The reaction mass is evaporated to dryness at 40° C., the residue taken up in hot ethyl acetate, precipitated with petroleum ether and the precipitate consisting of N-benzoyl-DL-threoninamide is filtered with suction.

The product forms fine needles when recrystallized from ethyl acetate/petroleum ether (1.9 g.; 85%) melting point, 163–164° C.

A solution of 0.42 g. of carbobenzoxy-glycine (2 millimols) of absolute triethylamine is mixed at —75° C. with 1.32 cc. (2.9 mmols) of a solution of phosgene in absolute toluene and allowed to stand for 15 minutes, except for occasional shaking. To the resulting milky product is added a solution of 0.22 g. of N-benzoyl-DL-threoninamide (1 millimol) in 4 cc. of pyridine, the faintly yellow mixture is allowed to stand for 24 hours at 0° C., then heated to 30° C., allowed to stand for 15 minutes, and evaporated at the same temperature until a viscous oil remains behind. This oil is taken up in 70 cc. of ethyl acetate, the solution washed with 20 cc. of 2 N-hydrochloric acid, 50 cc. of 10% potassium bicarbonate, and with 50 cc. of saturated sodium chloride solution, and dried over sodium sulfate. The reaction mass is evaporated to dryness at 40° C., the crude product (0.38 g.; 91.7%) taken up in a little acetone and mixed with petroleum ether until it becomes turbid, after which fine needles of O-(N-carbobenzoxy-glycyl)-N-benzoyl-DL-threoninamide are obtained which melt at 136–140° C. After recrystallization from acetone/petroleum ether the melting point is at 138–140° C.

The solution of 0.1 g. of O-(N-carbobenzoxy-glycyl)-N-benzoyl-threoninamide (0.25 mmol) in 15 cc. of glacial acetic acid and 0.25 cc. of a 1 N-solution of perchloric acid in glacial acetic acid is, after the addition of 50 mg. of 10% palladium charcoal, treated with hydrogen for 40 minutes (termination of the $CO_2$ evolution). The solution is filtered, and evaporated to dryness at 30° C. and the oily perchlorate of the O-glycyl-N-benzoyl-DL-threoninamide is stored over potassium hydroxide in an exsiccator.

*Example 6*

1.09 grams (2 millimols) of O-(Cbzo-L-phenylalanyl)-N-benzoyl-L-seryl-glycine-amide are dissolved in 100 ml. of glacial acetic acid, 2 ml. of 1 N-hydrochloric acid and 260 mg. of palladium carbon (10%) are added and treatment with hydrogen is continued until $CO_2$-evolution ceases. The filtered solution is freed as far as possible from acetic acid, the residue is taken up in 100 ml. of absolute dimethyl-formamide, and to the resulting solution there are added 5 ml. of 1 N-potassium tertiary butylate in absolute tertiary butanol. The solution is allowed to react for 30 minutes at 25° C. with stirring and about 10 milli-equivalents of Amberlite IR-120 (H-form), approximately 3 milli-equivalents of Amberlite IRA-400 (OH-form) and 100 ml. of water are added. After stirring for 15 minutes the solution has a neutral reaction. The solution is filtered, evaporated carefully to dryness under reduced pressure while repeatedly adding water, taken up in a little dry dimethyl-formamide and crystallized by adding absolute ether. Yield: 60%. The resulting N-benzoyl-L-seryl-L-phenylalanyl-glycine-amide forms needles melting at 261–265° C., and having the specific rotation $[\alpha]_D^{25} = -20.7°$ (c.=0.78; dimethyl-formamide).

The O - (Cbzo - L - phenyl - alanyl) - N - benzoyl - L-seryl-glycine-amide used as starting material can be obtained from N-benzoyl-L-seryl-glycine-amide (cf. Example 4) and Cbzo-L-phenylalanine in the same manner as the O-(Cbzo-glycyl)-N-benzoyl-L-serin-amide described in Example 4; it melts at 135° C.

*Example 7*

415 mg. (1 millimol) of S-(Cbzo-glycyl)-N-benzoyl-cystein-amide and 320 mg. of phosphonium iodide (2 millimols) are suspended in 20 ml. of absolute glacial acetic acid, agitated for 2½ hours at 60° C. and another 320 mg. of phosphonium iodide are added. The whole is agitated for another 2½ hours at 60° C., evaporated to dryness under reduced pressure, 10 ml. of benzene are added to the residue, and the whole is again evaporated to dryness under reduced pressure; the residue is treated a second and third time with benzene in the same manner. After adding 10 ml. of absolute tertiary butanol, there are added 5 ml. of 1 N-potassium tertiary butylate in tertiary butanol, the whole is agitated for 30 minutes at 25° C.; 0.35 ml. (3 millimols) of benzyl chloride and 3 ml. of 1 N-potassium tertiary butylate are added, and the whole is agitated for 2 hours at 25° C. and then evaporated to dryness under reduced pressure. The residue is distributed between 50 ml. of ethyl acetate and 20 ml. of 2 N-hydrochloric acid, a little insoluble material is filtered off, the ethyl acetate phase is extracted with 2 N-hydrochloric acid, water, 2 N-NaOH, washed neutral and dried, and the solvent is evaporated under reduced pressure. The glassy residue contains N-benzoyl-L-cysteinyl-glycine amide in the form of the S-benzyl compound; it shows a negative reaction to sodium nitroferricyanide. For the purpose of purification it is chromatographed on acid aluminum oxide. Pure N-benzoyl-S-benzyl-L-cysteinyl-glycine amide is obtained melting at 138–139° C.; it has the specific rotation $[\alpha]_D^{21} = 29.7°$ (c.=1 in 95% ethanol).

The S-(Cbzo-glycyl)-N-benzoyl-L-cystein-amide used as starting material can be obtained in the following manner:

10 ml. of thionyl chloride are poured on to 2.08 grams (10 millimols) of N-benzoyl-L-serin-amide (cf. Example 4) at —15° C., the whole is allowed to stand for 30 minutes at —15° C. with occasional agitation, dissolution being complete, and then maintained for 1 hour at 25° C. Crystallization occurs. The thionyl chloride is evaporated under reduced pressure, 30 ml. of chloroform and 50 ml. of 2 N-sodium carbonate are added to the residue, the whole is thoroughly agitated, separated, the chloroform solution is washed again with sodium carbonate, then with water, dried and evaporated under reduced pressure. The residue is dissolved in water and decolorized with carbon. Crystallization takes place at 0° C. of 2-phenyl-4-carbamino-oxazolin. Yield: 80%.

1.0 gram (5-millimols) of the oxazoline is intimately stirred with 2.07 grams (10 millimols) of N-Cbzo-thio-glycine (obtained from Cbzo-glycine and $H_2S$ according to the anhydride method, cf. Sheehan and Johnson, J. Amer. Chem. Soc. 74, 4727 (1952)) and heated for 3 hours on a steam bath (cf. E. M. Fry, J. of Organic Chem. 15, 438 (1950)). The resulting melt is triturated with 50 ml. of ethyl acetate and the insoluble reaction product separated by filtration. The so-obtained S-(Cbzo-glycyl)-N-benzoyl-L-cystein-amide is sufficiently pure for further processing.

*Example 8*

To 5.2 grams (30 millimols) of sharply dried leucine-isopropyl ester there are added 460 mg. (3 millimols) of serinamide-hydrochloride, 200 mg. of freshly annealed potassium carbonate and 9 ml. of 1 N-potassium tertiary butylate in tertiary butanol. The mixture is agitated for 24 hours at 25° C., viscosity gradually increasing. Alcoholysis of the leucine-isopropyl ester by the alcoholic serinhydroxyl takes place (cf. Brenner and Huber, Helv. Chim. Acta 36, 1109 (1953)); the O-leucyl-seramide is converted into seryl-leucine amide in basic medium, the alcoholic hydroxyl being regenerated and able to attack alcoholytically another molecule of leucine-isopropyl ester. The resulting ester is again converted with regeneration of hydroxyl group etc. A seryl-polyleucine amide is formed with which leucyl-seryl-polyleucine amide is also possibly mixed. For the purpose of working up, the volatile constituents are removed at 25° C. in high vacuum, 10 ml. of 1-N-acetic acid, 15 ml. of water and glacial acetic acid are added until the reaction is weakly acid (pH 5–6); the reaction mixture is triturated until the insoluble portion has become granular, filtered and thoroughly rinsed with water. The polymer contains much leucine in addition to little serin, is insoluble in water, 2 N-NaOH or alcohol, soluble in 80% phenol or concentrated hydrochloric acid (d. 1.19).

Instead of the hydrochloride of serinamide another salt, for example the hydrobromide, may be used. The above mentioned starting materials may be obtained as follows:

(a) As suspension of 30 grams of leucine in 300 ml. of absolute isopropanol is saturated with hydrogen chloride without cooling, boiled for one hour under reflux, evaporated to dryness under reduced pressure, the residue is mixed with 100 ml. of concentrated ammonia and the ester extracted with ether. On distilling the dried solution (potassium carbonate), there are obtained 31 grams (76%) of leucine-isopropyl-ester with boiling point 82–83° C. under 10 mm. pressure.

(b) Cbzo-serin is esterified with the aid of diazomethane, the ester is converted with methanolic ammonia into Cbzo-serinamide (melting point=110–111° C.) and the latter is debenzylated. With hydrogen in 60% methanol in the presence of palladium charcoal and 1 equivalent of 1 N-aqueous hydrochloride there is obtained serinamide hydrochloride; crystals are formed from a mixture of water and acetone which melt 198–200° C.; treatment with hydrobromide in glacial acetic acid yields the hydrobromide; crystals are formed from a mixture of ethanol and acetone which melt at 170–172° C.

What is claimed is:

1. Process for the manufacture of acylamino-carboxylic acid amides, which comprises treating a member selected from the group consisting of α-amino-carboxylic acid esters of α:β-saturated aliphatic β-hydroxy- and β-mercapto-carboxylic acid amides with at least one free amide and amino hydrogen atom each and salts of these compounds, with strongly basic agents whereby these esters are rearranged to form the corresponding acylamino-carboxylic acid amides.

2. Process as claimed in claim 1, wherein a tertiary alcoholate of the group consisting of alkali and alkaline earth metal in a tertiary alkanol is used as the condensing agent.

3. Process as claimed in claim 1, wherein a member selected from the group consisting of an alkali and an alkaline earth metal amide in liquid ammonia is used as the condensing agent.

4. Process as claimed in claim 1, wherein an ester formed from a natural α-amino acid and a member selected from the group consisting of aliphatic β-hydroxy- and β-mercapto-alkanoyl compounds of natural amino acids and β-hydroxy- and β-mercapto-peptides is used as starting material.

5. Process as claimed in claim 1, wherein an ester formed from a natural α-amino acid and a member selected from the group consisting of β-hydroxy- and β-mercaptoalkanoyl amides of natural amino acids and peptides is used as starting material in which the alkanoyl radical is a propionyl radical.

6. Process as claimed in claim 1, wherein an ester of a natural α-amino acid with a member selected from the group consisting of β-hydroxy- and β-mercaptoalkanoyl amides of natural amino acids and peptides is used as starting material in which the alkanoyl radical is a butyric acid radical.

7. Process as claimed in claim 1, wherein an ester of a natural α-amino acid with a member selected from the group consisting of β-hydroxy- and β-mercaptoalkanoyl amides of natural amino acids and peptides is used as starting material in which the alkanoyl radical is an N-substituted α-amino-propionyl radical, said α-amino substituent being a member selected from the group consisting of an amino acid, a peptide and a protected amino group.

8. Process as claimed in claim 1, wherein an ester of a natural α-amino acid with a member selected from the group consisting of cysteyl-, seryl- and threonyl amides of natural amino acids and peptides wherein the α-amino groups of said cysteyl, seryl and threonyl radicals is substituted with an amino acid is used as starting material.

9. A member selected from the group consisting of esters of α-amino-carboxylic acids with α:β-saturated aliphatic β-hydroxy-acyl-amides, esters of α-amino-carboxylic acids with α:β-saturated β-mercaptoacyl-amides and acid addition salts thereof.

10. Compounds as claimed in claim 9, in which the alkanoyl radical is propionyl.

11. Compounds as claimed in claim 9, in which the alkanoyl radical is n-butyryl.

12. Compounds as claimed in claim 10, in which the propionyl radical is an α-amino-propionyl radical wherein the α-amino group is protected.

13. Compounds as claimed in claim 12, in which the N-substitutent is a member selected from the group consisting of the radicals of natural amino acids and of peptides.

14. β-Hydroxy-acylamino-carboxylic acid amides.
15. β-Mercapto-acylamino-carboxylic acid amides.
16. Seryl-glycinamide.
17. Threonyl-glycin amide.

References Cited in the file of this patent
UNITED STATES PATENTS
2,850,491   Brenner _____ Sept. 2, 1958